US012768449B2

(12) United States Patent
Zhang et al.

(10) Patent No.: US 12,768,449 B2
(45) Date of Patent: Oct. 20, 2026

(54) SEALING STRUCTURE

(71) Applicant: AKTIEBOLAGET SKF, Gothenburg (SE)

(72) Inventors: Yi Zhang, Shanghai (CN); Yuanzeng Ding, Wuhu (CN); Juergen Netzer, Burscheid (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/235,744

(22) Filed: Jun. 12, 2025

(65) Prior Publication Data

US 2025/0389331 A1 Dec. 25, 2025

(30) Foreign Application Priority Data

Jun. 19, 2024 (CN) ......................... 202410796352.6

(51) Int. Cl.
*F16J 15/32* (2016.01)
*F16J 15/3204* (2016.01)

(52) U.S. Cl.
CPC ................................. *F16J 15/3204* (2013.01)

(58) Field of Classification Search
CPC .................................................... F16J 15/3204
See application file for complete search history.

(56) References Cited

U.S. PATENT DOCUMENTS

| | | | | |
|---|---|---|---|---|
| 8,141,882 | B2 * | 3/2012 | Wang | F16J 15/3264<br>277/353 |
| 9,651,155 | B2 * | 5/2017 | Angiulli | F16J 15/3232 |
| 9,914,326 | B2 * | 3/2018 | White | F16C 33/7886 |
| 12,203,551 | B1 * | 1/2025 | Beathard | F16J 15/3236 |
| 2021/0239217 | A1 * | 8/2021 | Wilkins | F16J 15/3268 |
| 2022/0307604 | A1 * | 9/2022 | Wu | F16J 15/3456 |

* cited by examiner

*Primary Examiner* — Vishal A Patel
(74) *Attorney, Agent, or Firm* — J-TEK LAW PLLC; Scott T. Wakeman; Mark A. Ussai

(57) ABSTRACT

A sealing structure includes an inner sealing ring with a first stepped portion having an L-shaped cross section and a second stepped portion having an L-shaped cross section, the first stepped portion being connected to the second stepped portion and an outer sealing ring having a circumferential annular groove with an axially extending first side wall and an axially extending second side wall. The first stepped portion of the inner sealing ring is located in the annular groove of the outer sealing ring, the second stepped portion of the inner sealing ring is located axially adjacent to the first side wall of the outer sealing ring, and a radially outer side of the first side wall of the outer sealing ring includes at least one sealing lip.

10 Claims, 1 Drawing Sheet

SEALING STRUCTURE

CROSS-REFERENCE

This application claims priority to Chinese patent application no. 202410796352.6 filed on Jun. 19, 2025, the contents of which are fully incorporated herein by reference.

TECHNOLOGICAL FIELD

The present disclosure relates to a sealing structure, in particular a sealing structure useful for sealing between a wheel hub and a wheel axle.

BACKGROUND

Sealing structures are often needed in various devices and instruments. Especially for relatively rotating parts, when there is a need for sealing between them, the requirements for the sealing structure will be very stringent.

For example, for sealing between the axle and the hub of a vehicle, especially when the vehicle needs to work in a harsh working environment, such as a muck truck, a mineral vehicle, an agricultural vehicle, and the like, the sealing structure between the axle and the hub needs to have a longer life in addition to effectively and reliably sealing against contaminants such as mud, dust and the like. Therefore, the performance of the sealing structure directly affects the life and performance of the wheel itself.

Conventional sealing structures tend to comprise two components, an outer seal facing the external environment and an inner seal facing the inside. However, if the structural design and fitting relationship of the inner and outer seals are not good, it is difficult to meet the increasingly high sealing requirements. For example, some vehicles need to ensure that the wheels can perform well in a 1400-hour mud test, however, it is difficult for conventional sealing structures to pass such tests.

Accordingly, there is a desire in the art for a sealing structure capable of achieving a reliable sealing performance while also having a longer service life.

SUMMARY

In view of the above-mentioned problems and requirements, the present disclosure provides a new technical solution, which solves the above-mentioned problems by adopting the following technical features and brings other technical effects.

The present disclosure provides a sealing structure comprising: an inner sealing ring having a stepped cross section and comprising a first stepped portion and a second stepped portion connected to each other wherein each of the first stepped portion and the second stepped portion has an L-shaped cross section; an outer sealing ring having an annular groove formed in the circumferential direction, the annular groove having a first side wall and a second side wall extending in the axial direction; wherein the first stepped portion of the inner sealing ring is located in the annular groove of the outer sealing ring, and the second stepped portion of the inner sealing ring is located above the first side wall of the outer sealing ring; wherein the outer side of the first side wall of the outer sealing ring has at least one sealing lip.

The sealing structure of the present disclosure provides a sealing structure that provides a longer contaminant travel path and provides a more complex labyrinth structure in the contaminant travel path and more effectively prevents contaminants from entering the interior of the sealing structure by providing sealing lips at key locations. This sealing structure is suitable for higher rotational speed and harsher working environment, and ensures that the sealed components (such as wheels) have longer life and higher reliability.

DETAILED DESCRIPTION

Figure 1:
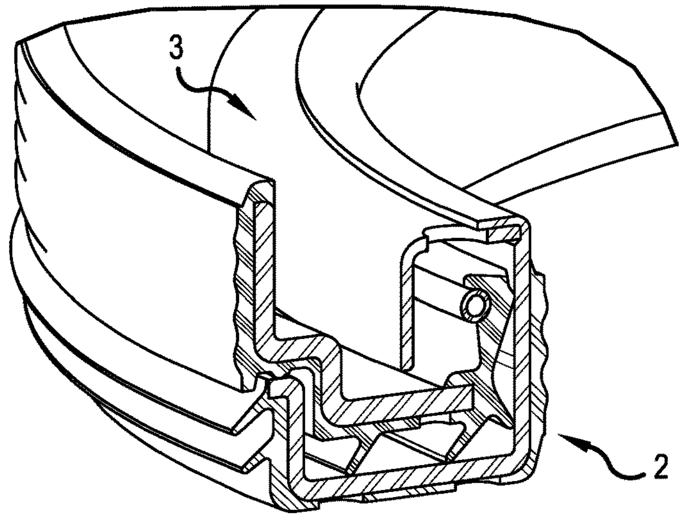
FIG. 1 is a perspective view, partly in section, of a sealing structure according to an exemplary embodiment of the present disclosure.

In order to make the purpose, technical solution and advantages of the technical solution of the present disclosure clearer, the technical solution of the embodiment of the present disclosure will be described clearly and completely in the following with the attached drawings of specific embodiments of the present disclosure. Like reference numerals in the drawings represent like components. It should be noted that a described embodiment is a part of the embodiments of the present disclosure, not the whole embodiments. Based on the described embodiments of the present disclosure, all other embodiments obtained by those skilled in the field without creative labor fall into the scope of protection of the present disclosure.

In comparison with the embodiments shown in the attached drawings, feasible embodiments within the protection scope of the present disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by those skilled in the field to which this disclosure belongs. The terms “first”, “second” and similar terms used in the specification and claims of the patent application of this disclosure do not indicate any order, quantity or importance, but are only used to distinguish different components. When the number of components is not specified, the number of components can be one or more. Similarly, terms such as “a/an”, “the” and “said” do not necessarily mean quantity limitation. Similar terms such as “comprises” or “comprising” mean that the elements or objects appearing before the terms cover the elements or objects listed after the terms and their equivalents, without excluding other elements or objects. Similar terms such as “installation”, “setting”, “connecting” or “matching” are not limited to physical or mechanical installation, setting and connection, but can include electrical installation, setting and connection, whether directly or indirectly. “Up”, “down”, “left” and “right” are only used to indicate the relative orientation relationship when the equipment is used or the orientation relationship shown in the attached drawings. When the absolute position of the described object changes, the relative orientation relationship may also change accordingly. Likewise, “inside”, “inner”, “outside”, and “outer” are relative to the inside and outside of the described structure. For convenience of illustration, the direction of the axis of rotation of the axle is referred to herein as the axial direction, and the direction perpendicular to the axial direction is referred to as the radial direction.

Hereinafter, the sealing structure of the present disclosure will be described with reference to the drawings.

Figure 2:
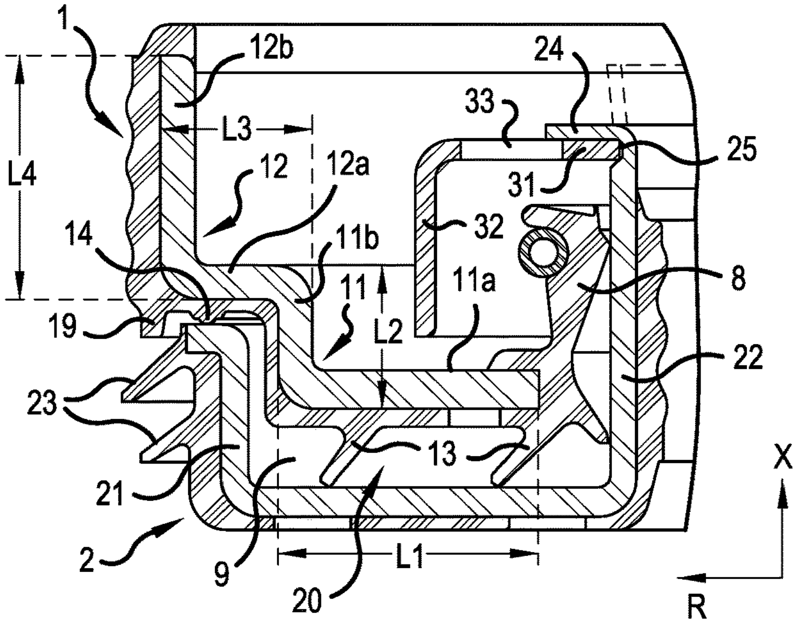
FIG. 2 is a cross-sectional view of the sealing structure of FIG. 1.

FIG. 1 shows a sealing structure according to an exemplary embodiment of the present disclosure, which mainly comprises an inner sealing ring 1 and an outer sealing ring 2. Preferably, the sealing structure may further comprise a retaining ring 3. The sealing structure, for example, can be well adapted to be mounted between a hub bore and an axle of a wheel. For the convenience of illustration, the axial direction of the axle herein is X, and correspondingly, the radial direction is R, as shown in FIG. 2. Of course, the sealing structure may also be used for other components that do not rotate relative to each other but need sealing for gaps.

In particular, referring to FIGS. 1 and 2, the inner sealing ring 1 has a stepped cross section and includes a first stepped portion 11 and a second stepped portion 12 connected to each other. Each of the first stepped portion 11 and the second stepped portion 12 has an L-shaped cross section. The L-shaped cross section of the first stepped portion 11 comprises a first linear portion 11*a* having a first length L1 and a second linear portion 11*b* having a second length L2, the second length being less than the first length L1, and the second linear portion L2 extends from an end of the first linear portion L1 at a first right angle. The L-shaped cross section of the second stepped portion 12 comprises a third linear portion 12*a* having a third length L3 and a fourth linear portion 12*b* having a fourth length L4, the fourth length L4 being greater than the third length L3. The fourth linear portion 12*b* extends from an end of the third linear portion 12*a* at a second right angle, and the third linear portion 12*a* extends from an end of the second linear portion 11*b* at a third right angle. The outer sealing ring 2 has an annular groove 20 formed in the circumferential direction. The annular groove 20 has a first side wall 21 and a second side wall 22 extending in the axial direction.

Further, the first stepped portion 11 of the inner sealing ring 1 is located in the annular groove 20 of the outer sealing ring 2, and the second stepped portion 12 of the inner sealing ring 1 is located above the first side wall 21 of the outer sealing ring 2. The outer side of the first side wall 21 of the outer sealing ring 2 has at least one sealing lip 23. Thus, the inner sealing ring 1 and the outer sealing ring 2 form a partially nested configuration.

As previously described, the sealing structure may be mounted between the hub bore and the axle of a wheel, for example, the inner sealing ring 1 may be mounted against the inner wall of the hub bore through the second stepped portion 12, and the second side wall 22 of the outer sealing ring 2 may be mounted against the axle. Therefore, during the running of the wheel, due to the existence of the first side wall 21, contaminants must travel a longer distance before they can enter the interior of the sealing structure. Furthermore, the at least one sealing lip 23 may form as a contact sealing lip or a non-contact sealing lip relative to the wall surface of the hub bore to which it faces, i.e. interference or clearance fit with the wall surface of the hub bore may be formed to further effectively block the entry of contaminants. Therefore, compared with conventional sealing structures, the sealing structure of the present disclosure further increases the difficulty of contaminants entering the interior of the sealing structure. As can be known from the following, in addition to disposing a sealing lip that directly blocks contaminants, a labyrinth that blocks the entry of contaminants is formed inside the sealing structure through path design, which can effectively improve the sealing effect, thereby improving the sealing structure and the life of the wheel.

It should be understood that the inner seal ring 1 and the outer seal ring 2 may be formed by any suitable material and manufacture process. Preferably, the material that can be used for sealing includes rubber or the like, for example hydrogenated nitrile butadiene rubber (HNBR) or fluorine rubber. The inner sealing ring 1 and the outer sealing ring 2 may be formed directly of rubber, or may also be formed by overmolding sealing material on a skeleton. It should be understood that the skeleton mainly plays a role in increasing strength, and the sealing lips, contact portions, etc. hereinafter are formed from sealing material.

Preferably, the outer side of the first side wall 21 of the outer sealing ring 2 has at least one sealing lip 23. In the exemplary embodiment shown in FIG. 2, the sealing structure comprises two sealing lips 23.

Further, the spacing between adjacent sealing lips 23 may be ⅕ to ½ of the axial length of the first side wall 21. Further, the length of each sealing lip 23 may be ¼ to ½ of the axial length of the first side wall 21. Further, the thickness of each sealing lip 23 may be 1/18 to 1/12 of the axial length of the first side wall 21.

For example, for a wheel having an axle of 160 mm and a hub hole of 200 mm, the axial length of the first sidewall 21 may be 2 mm-15 mm, and the spacing between the sealing lips 23 may be 1 mm-3 mm, the length of the sealing lips may be 1 mm-4 mm, and the thickness of the sealing lips may be 0.3 mm-1 mm.

Preferably, each sealing lip 23 may be inclined at an angle of 10°-70°, preferably an angle of 20°-60°, with respect to the first side wall 21. It will be understood that the inclined direction of the sealing lip 23 is provided such that the sealing lip 23 can be deflected towards the inner wall of the hub bore when contaminants act on the sealing lip 23.

Referring further to FIG. 2, the side of the first stepped portion 11 facing the bottom of the annular groove 20 may also have at least one sealing lip 13. Since the first stepped portion 11 is located in the annular groove 20, there is a space between the first stepped portion 11 and the bottom of the annular groove 20, and thus, the provision of the sealing lip 13 can further prevent contaminants from entering the interior of the sealing structure from this space. Furthermore, according to a further exemplary embodiment not shown, the side of the annular groove 20 facing the bottom of the first stepped portion 11 may also have at least one sealing lip (not shown).

Further preferably, the space 9 formed between the first stepped portion 11 of the inner sealing ring 1 and the annular groove 20 of the outer sealing ring 2 (the space comprises the space between the first stepped portion 11 and the bottom of the annular groove 20 as well as the first side wall 21) is filled with lubricant, thereby improving the contact between the sealing lip 13 and the bottom wall of the annular groove 20.

Furthermore, according to an exemplary embodiment not shown, the side of the first stepped portion 11 facing the first side wall 21 may have at least one sealing lip. According to a further exemplary embodiment, not shown, the side of the first side wall 21 facing the first stepped portion 11 may have at least one sealing lip. Accordingly, the space between the first stepped portion 11 and the first side wall 21 can also be provided with a structure for preventing the entry of contaminants.

Referring further to FIG. 2, the side of the second stepped portion 12 facing the first side wall 21 has a protrusion 14 in contact with the first side wall 21, and the protrusion 14 is formed continuously in the circumferential direction or formed by circumferentially discontinuous segments. The formation of the protrusion 14 further increases the hindrance to contaminants attempting to enter the interior of the sealing structure.

Figure 3A:
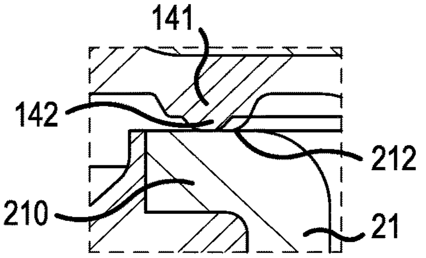
FIGS. 3A and 3B are schematic sectional views of a region of contact between a second stepped portion and an outer sealing ring in a sealing structure according to an exemplary embodiment of the present disclosure.

Further preferably, referring to FIG. 3A, the protrusion 14 may have a base portion 141 and a boss 142 formed on the base portion 141, the boss 142 being in contact with the first side wall 21. Preferably, a plurality of bosses 142 spaced apart from each other are formed on the base portion 141. Further preferably, 5 to 25 bosses 142 are formed on the base portion 141 in the circumferential direction, and/or the spacing between adjacent bosses 142 is 20 mm-65 mm. It should also be understood that, according to an embodiment not shown, if the protrusions 14 are formed by circumferentially discontinuous segments, each segment may comprise a base, and one or more bosses may be formed on each base. The formation of the boss can reduce the contact area between the second stepped portion 12 and the outer seal ring 2, thereby improving the frictional torque between the two.

Figure 3B:
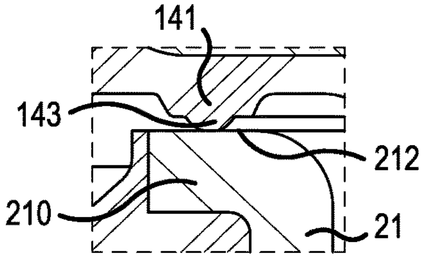

Referring to FIG. 3B, according to another modification, in a case where the protrusion 14 is formed continuously in the circumferential direction, the protrusion 14 may have a base portion 141 and a continuous flange 143 formed on the base portion 141 and having a radial width smaller than the radial width of the base portion 141, and the continuous flange 143 may also be in contact with the first side wall 21.

Further preferably, the first side wall 21 of the outer sealing ring 2 comprises a bent edge 210 extending in the radial direction, and the boss 142 or the continuous flange 143 is in contact with the axial face 212 of the bent edge 210. If such a bent edge is not formed, the boss 142 will come into contact with the end face of the first side wall 21, which end face tends to be rough and uneven and tends to cause severe wear to the boss 142 or the continuous flange 143, whereas by forming such a bent edge 210 (usually formed during the stamping of the outer seal ring 2), the surface thereof is smoother, thereby improving its contact with the boss 142 or the continuous flange 143.

Further, by forming the above-described structure, in the case where the space 9 formed between the first stepped portion 11 and the annular groove 20 is filled with lubricant, when the wheel rotates, the lubricant in the space 9 will be thrown onto the boss 142 or the continuous flange 143 due to the rotation of the outer seal ring 2 together with the wheel axle, thereby realizing lubrication thereof. In addition, where only the bosses 142 are formed, some lubricant will also flow out to the sealing lip 23 through the gaps between the bosses 142 to lubricate the sealing lip 23.

With continued reference to FIG. 2, according to an exemplary embodiment, the outer side wall of the second stepped portion 12 of the inner sealing ring 1 has an annular rib 19 extending towards the sealing lip 23. This annular rib 19 not only further increases the additional barrier against contaminants, but also acts as a kind of barrier against the lubricant thrown out of the space 9, preventing excessive loss of the lubricant.

According to an exemplary embodiment, the present disclosure also provides a retaining ring 3 for maintaining the assembled state of the inner sealing ring 1 and the outer sealing ring 2. The retaining ring 3 may have a substantially L-shaped cross section, i.e. may have a radial side wall 31 and an axial side wall 32.

Furthermore, the second side wall 22 of the outer sealing ring 2 comprises an annular groove 25 and a bent edge 24 extending radially from the annular groove 25 such that the radial side wall 31 of the retaining ring 3 is sandwiched in the annular groove 25 by the bent edge 24.

Specifically, in a preliminarily assembled state of the inner sealing ring 1 and the outer sealing ring 2, the bent edge 24 has not been bent but extends substantially in the direction of the second side wall 22 (generally shown in dashed lines in FIG. 2), after preliminary assembly, the radial side wall 31 of the retaining ring 3 is positioned at the annular groove 25 and bent by a machining tool until the radial side wall 31 of the retaining ring 3 is sandwiched, so that the retaining ring 3 is configured to block the axial movement of the first stepped portion 11 of the inner sealing ring 1 by axial side wall 32 of the retaining ring 3, and the main sealing lip 8 formed at the edge of the first stepped portion 11 of the inner sealing ring 1 is located in the space between the axial side wall 32 and the second side wall 22 of the retaining ring 2.

Further preferably, the radial side wall 31 of the retaining ring 3 comprises a plurality of through holes 33 distributed in the axial direction. Since there is usually lubricant for lubricating the internal components of the hub inside the inner seal ring 1, the presence of the through hole 33 can provide communication between the spaces on both sides of the retaining ring 3 thereby preventing the formation of any vacuum area or high pressure area in the corner of the retaining ring 3.

The sealing structure of the present disclosure provides a sealing structure that provides a longer contaminant travel path and provides a more complex labyrinth structure in the contaminant travel path, and more effectively prevents contaminants from entering the interior of the sealing structure by providing sealing lips at key locations. This sealing structure is suitable for higher rotational speed and harsher working environment, and ensures that the sealed components (such as wheels) have longer life and higher reliability.

The exemplary embodiments of the present disclosure have been described in detail above with reference to exemplary embodiments, but those skilled in the art can understand that various modifications and modifications can be made to the above specific embodiments without departing from the concept of the present disclosure, and various combinations of various technical features and structures proposed in the present disclosure can be made without exceeding the scope of protection of the present disclosure, which is determined by the appended claims.

What is claimed is:

1. A sealing structure comprising:

an inner sealing ring having a stepped cross section and comprising a first stepped portion having an L-shaped cross section and a second stepped portion having an L-shaped cross section, the first stepped portion being connected to the second stepped portion; and an outer sealing ring having a circumferential annular groove having an axially extending first side wall and an axially extending second side wall, the axially extending first side wall having a bent edge extending in a radial direction, wherein the first stepped portion of the inner sealing ring is located in the annular groove of the outer sealing ring, wherein the second stepped portion of the inner sealing ring is located axially adjacent to the first side wall of the outer sealing ring, and wherein a radially outer side of the first side wall of the outer sealing ring includes a plurality of sealing lips, wherein a spacing between adjacent sealing lips of the plurality of sealing lips is ⅕ to ½ of an axial length of the first side wall, wherein each sealing lip of the plurality of sealing lips has a length of ¼ to ½ of the axial length of the first side wall, wherein each sealing lip of the plurality of sealing lips has a thickness of 1/18 to 1/12 of the axial length of the first side wall, wherein the L-shaped cross section of the first stepped portion comprises a first linear portion of the inner sealing ring having a first length and a second linear portion of the inner sealing ring having a second length, the second length being less than the first length, wherein the second linear portion extends from an end of the first linear portion at a first right angle, wherein the L-shaped cross section of the second stepped portion comprises a third linear portion of the inner sealing ring having a third length and a fourth linear portion of the inner sealing ring having a fourth length, the fourth length being greater than the third length, wherein the fourth linear portion extends from an end of the third linear portion at a second right angle, and wherein the third linear portion extends from an end of the second linear portion at a third right angle, wherein a body of elastomeric material at least partially covers a first side of the second stepped portion, the body of elastomeric material having a body surface facing the first side wall and a continuous circumferential ridge projecting from the body surface toward the first side wall, the ridge having a ridge surface facing the first side wall, a distance from the ridge surface to the first side wall being less than a distance from the body surface to the first side wall, and wherein either:

a) a continuous circumferential bead projects from the ridge surface to the bent edge of the first side wall, or b) a plurality of bosses project from the continuous circumferential ridge to the bent edge of the first side wall.

2. The sealing structure of claim 1, wherein a side of the first linear portion of the first stepped portion facing a bottom of the annular groove has at least one sealing lip.

3. The sealing structure of claim 1, wherein the at least one sealing lip is inclined at an angle of 10°-70° with respect to the first side wall.

4. The sealing structure as claimed in claim 1, wherein a space formed between the first stepped portion of the inner sealing ring and the annular groove of the outer sealing ring is filled with lubricant.

5. The sealing structure of claim 1, further comprising a retaining ring having a radial side wall and an axial side wall, wherein the second side wall of the outer sealing ring includes an annular groove and a bent edge extending radially from the annular groove such that the radial side wall of the retaining ring is sandwiched in the annular groove by the bent edge.

6. The sealing structure of claim 5, wherein the axial side wall of the retaining ring is configured to block axial movement of the first stepped portion of the inner sealing ring, wherein a main sealing lip formed at an edge of the first stepped portion is located in a space between the axial side wall of the retaining ring and the second side wall of the outer sealing ring, and the radial side wall includes a plurality of through holes.

7. The sealing structure according to claim 1, wherein the continuous circumferential bead projects from the ridge surface to the bent edge of the first side wall, wherein the continuous circumferential ridge includes a radially inner side wall extending from a radially inner ridge edge at the body surface to the ridge surface and a radially outer side wall extending from a radially outer ridge edge at the body surface to the ridge surface, wherein the bead has a radially inner bead edge at the ridge surface and a radially outer bead edge at the ridge surface, and wherein a radially inner portion of the ridge surface is located between the radially inner bead edge and the radially inner side wall and a radially outer portion of the ridge surface is located between the radially outer bead edge and the radially outer side wall.

8. The sealing structure according to claim 1, wherein the plurality of bosses project from the continuous circumferential ridge to the bent edge of the first side wall, wherein each of the bosses has a boss periphery on the protrusion surface, and wherein a continuous annular portion of the protrusion surface surrounds each of the boss peripheries.

9. The sealing structure according to claim 1, wherein the plurality of bosses project from the continuous circumferential ridge to the bent edge of the first side wall, and wherein a convex surface of each of the bosses contacts the bent edge of the first side wall.

10. The sealing structure according to claim 9, wherein the plurality of bosses comprises 5 to 25 circumferentially spaced bosses, and wherein a spacing between adjacent bosses is 20 mm-65 mm.

* * * * *